(12) United States Patent
Ljunggren

(10) Patent No.: US 11,142,702 B2
(45) Date of Patent: Oct. 12, 2021

(54) PROCESS AND APPARATUS FOR HYDROTREATMENT OF PYROLYSIS OIL

(71) Applicant: CORTUS AB, Kista (SE)

(72) Inventor: Rolf Ljunggren, Sollentuna (SE)

(73) Assignee: Cortus AB, Kista (SE)

( * ) Notice: Subject to any disclaimer, the term of this patent is extended or adjusted under 35 U.S.C. 154(b) by 0 days.

(21) Appl. No.: 16/649,714

(22) PCT Filed: Oct. 8, 2018

(86) PCT No.: PCT/SE2018/051032
§ 371 (c)(1),
(2) Date: Mar. 23, 2020

(87) PCT Pub. No.: WO2019/074431
PCT Pub. Date: Apr. 18, 2019

(65) Prior Publication Data
US 2020/0255745 A1     Aug. 13, 2020

(30) Foreign Application Priority Data
Oct. 13, 2017   (SE) .................................. 1751273-2

(51) Int. Cl.
*C10G 3/00*        (2006.01)
*C10B 53/02*       (2006.01)
(Continued)

(52) U.S. Cl.
CPC .................. *C10G 3/50* (2013.01); *B01J 3/00* (2013.01); *C10B 53/02* (2013.01); *C10J 3/00* (2013.01);
(Continued)

(58) Field of Classification Search
USPC ............... 585/240–242; 202/85–86, 96, 105; 48/78, 81, 63, 89, 111, 127.3, 127.7
See application file for complete search history.

(56) References Cited

U.S. PATENT DOCUMENTS 3,698,882 A    10/1972  Garrett et al.
5,753,010 A     5/1998  Sircar et al.
(Continued)

FOREIGN PATENT DOCUMENTS

EP        1580253 A1 *  9/2005  ............. C10K 3/006
WO     WO 2011/060556      5/2011

OTHER PUBLICATIONS

Munz, B. G. et al "Biogas to Pipeline-Quality Gas Using Pressure-Swing Adsoption" TECHBriefs, 2010, No. 2, pp. 1-7.; whole document.
(Continued)

*Primary Examiner* — Nina Bhat
(74) *Attorney, Agent, or Firm* — Mark P. Stone

(57) ABSTRACT

Apparatus and process for producing hydrocarbons from biomass having a pyrolysis reactor (2) in which dry biomass (Bd) is heated in an environment substantially free from oxygen and halogens, a pyrolysis product (PP) and char (C) is produced, a gasification reactor (3) in which separated char (C) is heated in an environment containing steam (Wst) to reduce the char (C) to produce a synthesis gas (Sh), a gas cooler (4) in which the produced synthesis gas (Sh) is cooled to a cooled synthesis gas (Srt); a conditioning and pressure system (5) in which cooled synthesis gas (Srt) is refined to produce a purified synthesis gas (Sp), and a separation device (6) in which hydrogen gas (H2) is separated from purified synthesis gas (Sp). A hydrogenation device (7) into which pyrolysis oil (PO) retrieved from the pyrolysis product (PP) and separated hydrogen gas (H2) recuperated from the separation device (6) are introduced for hydrogenation in which pyrolysis oil (PO) is hydrogenated by the presence of hydrogen gas (H2), and hydrocarbons (BO) that are substantially free from oxygen are produced.

21 Claims, 1 Drawing Sheet

(51) Int. Cl.
*B01J 3/00* (2006.01)
*C10J 3/00* (2006.01)
*C10K 1/04* (2006.01)
*B01J 19/18* (2006.01)

(52) U.S. Cl.
CPC .............. *C10K 1/04* (2013.01); *B01J 19/18* (2013.01); *B01J 2219/00* (2013.01); *C10G 2300/1011* (2013.01); *C10J 2300/0916* (2013.01); *C10J 2300/0976* (2013.01); *C10J 2300/16* (2013.01)

(56) References Cited

U.S. PATENT DOCUMENTS

| | | | | |
|---|---|---|---|---|
| 8,383,871 | B1* | 2/2013 | Sellars | C10G 45/08 |
| | | | | 585/240 |
| 8,772,556 | B2* | 7/2014 | Ditsch | C01B 3/16 |
| | | | | 585/240 |
| 9,394,171 | B2* | 7/2016 | Keefer | B01J 38/22 |
| 10,526,555 | B2* | 1/2020 | Urade | B01J 23/755 |
| 2010/0115841 | A1* | 5/2010 | Cork | C10L 9/08 |
| | | | | 48/209 |
| 2010/0228062 | A1* | 9/2010 | Babicki | C10B 53/02 |
| | | | | 585/240 |
| 2010/0273899 | A1* | 10/2010 | Winter | C01B 3/382 |
| | | | | 518/703 |
| 2013/0017460 | A1* | 1/2013 | Keefer | C10L 3/08 |
| | | | | 429/419 |
| 2013/0118075 | A1* | 5/2013 | Hazewinkel | C10G 1/10 |
| | | | | 48/102 R |
| 2013/0247448 | A1* | 9/2013 | Ampulski | C10K 3/026 |
| | | | | 44/307 |
| 2013/0340322 | A1 | 12/2013 | Knight et al. | |
| 2014/0298716 | A1* | 10/2014 | Marty | C10B 53/02 |
| | | | | 44/629 |
| 2015/0013224 | A1* | 1/2015 | Tetzlaff | C10J 3/66 |
| | | | | 48/111 |
| 2016/0304797 | A1* | 10/2016 | Gaia | F01D 15/10 |

OTHER PUBLICATIONS

Koch, D. R. et al, "Proper pretreatment systems reduce membrane replacement element costs and improve reliability", in "Proceedings of the laurance reid gas conditioning conference", 2005, 25.; whole document.

* cited by examiner

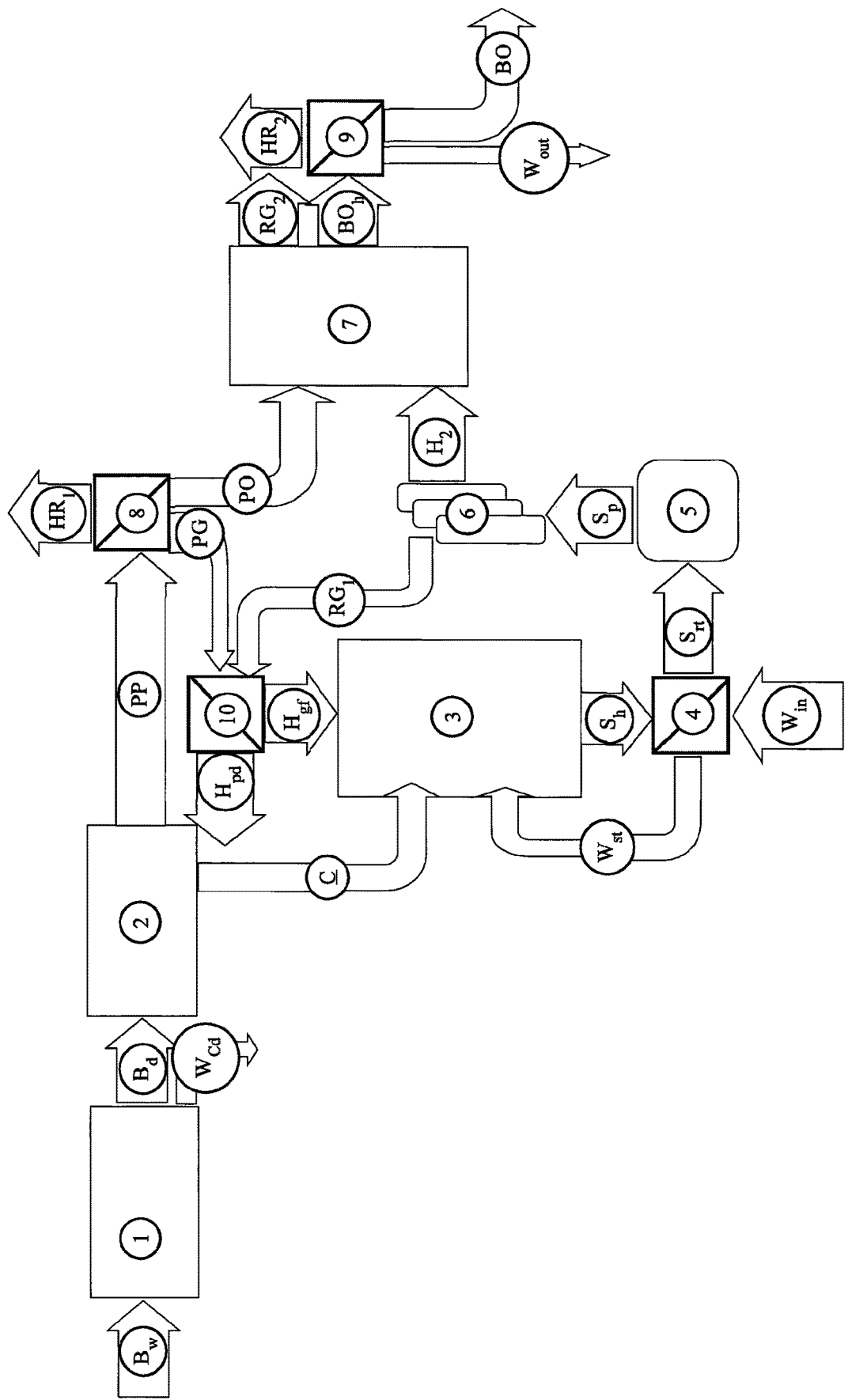

PROCESS AND APPARATUS FOR HYDROTREATMENT OF PYROLYSIS OIL

TECHNICAL FIELD

The invention relates to a process and an apparatus for hydrotreatment of pyrolysis oil from biomass, and especially a self-balanced process in which no other inputs are needed than biomass, water, air and a regulated amount of heat.

BACKGROUND

The use of biomass has become important in the production of "green" energy, e.g. in in the form of production of electric energy, or for providing environmental friendly fuels for transportation. From the prior art it is known to produce synthesis gases or hydrogen from biomass. Due to its varied composition and relatively low energy density synthesis gas is not appropriate as a storable product. Hydrogen has a higher energy density than synthesis gas and is today commonly used as fuel for vehicles. However, the fraction of vehicles driven by hydrogen is still very low and the demand of hydrogen as a fuel is still relatively low.

A process and equipment for producing synthesis gas from biomass is described in WO 2008/073021 A1, which process includes heat exchanging steps to maximise the outcome of the reaction. The process is therefore advantageous in that only very little energy needs to be added to the process in order to produce the synthesis gas However, as indicated above, synthesis gas is often subjected to further processes before use. Therefore, it would be advantageous to provide an energy effective process in which a more refined final product may be provided from biomass.

The process for a hydrogen treatment of pyrolysis oil from an integrated biomass gasification unit addresses the problem of obtaining pure hydrocarbons, i.e. substantially without oxygen, nitrogen or sulphur, out of a renewable natural resource, such as biomass.

Biomass is typically based on cellulose products containing about 50% carbon, 7% hydrogen, 42% oxygen and the rest being inorganics such as salts and ashes. A key to generating a high energy density product from this natural biomass is to separate oxygen from the final product.

In gasification of biomass the most advanced technologies can generate a high value synthesis gas with up to 60% hydrogen content, but the remaining will generally comprise oxygen.

Pyrolysis processes of biomass generates a solid char, pyrolysis gas and a liquid pyrolysis oil. A pyrolysis oil mainly consists of oxygenated hydrocarbons, usually referred to as tars. The oxygen present in such tar products makes the oil instable and, in addition, it limits the energy value of the hydrocarbon, as it is already partly oxidized. There are different methods of generating pyrolysis products and the distinction is often made between fast and slow pyrolysis, based on how rapidly the biomass is heated. With a rapid pyrolysis, a high yield of liquid char is generated and with a slow process a high yield of solid char is generated.

Downstream treatment of pyrolysis oil is generally performed to increase the energy value by oxygen removal. The process of doing so consumes hydrogen and generates water as a byproduct. This also means that the mass yield of pyrolysis oil decreases as the energy value increases due the removal of oxygen. This process is typically a catalytic process performed at an elevated temperature and pressure.

Conventionally, the hydrogen consumed in the deoxygenation of the pyrolysis oil is typically coming from a non-renewal source of hydrogen. Namely, conventionally, the dominant hydrogen source is water gas shift from natural gas, which is not a renewable source of hydrogen, but instead a fossil source that generates carbon dioxide and increases the global balance thereof.

Therefore, it would be desirable to find an environmental friendly and energy effective process of producing bio oil from biomass, without the use of fossil-based resources and without disrupting the global balance of carbon dioxide.

SUMMARY OF THE INVENTION

It is an object of the present invention to provide hydrocarbons from biomass in an energy efficient process. The inventive process of hydrogen treatment of pyrolysis oil from an integrated biomass gasification unit solves these problems and generates hydrocarbons, with none or a very low content of oxygen at a high energy yield in a renewable process.

According to a first aspect the invention relates to a process for producing hydrocarbons from biomass, the process comprising the following steps:
  a pyrolysis step in which dry biomass is heated in an inert environment, wherein a pyrolysis product and char is produced;
  a pyrolysis separator step in which the char is separated from the pyrolysis product,
  a gasification step, in which the separated char is heated in an environment containing water steam but substantially no oxygen or halogens so as to reduce said char to produce a synthesis gas,
  a step of cooling and refining the produced synthesis gas so as to produce a purified synthesis gas,
  a gas separator step in which hydrogen gas is separated from the purified synthesis gas, characterised by retrieving pyrolysis oil by separating at least a portion of the hydrogen gas and recuperate it into a hydrogenation step, in which the pyrolysis oil is hydrogenated by the presence of the hydrogen gas, wherein hydrocarbons that are substantially free from oxygen are produced.

The process may also include a step of drying wet biomass into dry biomass, which step is performed prior to the pyrolysis step.

The pyrolysis product may be cooled in a condenser, whereby excess heat is produced, which may be utilized in the step of drying the wet biomass. Further, the produced hydrocarbons may be cooled in a cooling device, wherein excess heat generated in said cooling device may be utilized in the step of drying the wet biomass.

In a preferred embodiment, at least one step of heat exchange is comprised in the process, where excess heat of at least one step is utilised in a heat demanding step of at least one other step.

In one specific embodiment all steps of the process, except the gasification step where the separated char is heated to produce a synthesis gas, are heated by excess heat from other steps of the process.

All steps of the process may be heated by excess heat from other steps of the process, or from exothermic reactions of residual products produced in other steps of the process.

In a specific embodiment a residual gas produced as a by-product in the gas separator step is utilized in a heat exchanger to produce heat for the step of gasification of the separated char and/or heat for the pyrolysis step.

In a specific embodiment a residual gas produced as a by-product in the hydrogenation step is utilized in heat exchanger to produce heat for the step of gasification of the separated char and/or heat for the pyrolysis step.

According to second aspect the invention relates to an apparatus for producing hydrocarbons from biomass, the apparatus comprising:

- a pyrolysis reactor in which dry biomass is heated in an environment substantially free from oxygen and halogens, wherein a pyrolysis product and char is produced;
- a gasification reactor in which the separated char is heated in an environment containing steam but substantially no oxygen or halogens so as to reduce said char to produce a synthesis gas,
- a gas cooler in which the produced synthesis gas is cooled to a cooled synthesis gas;
- a conditioning and pressure system, in which the cooled synthesis gas is refined so as to produce a purified synthesis gas,
- a separation device, in which hydrogen gas is separated from the purified synthesis gas, characterised in that the apparatus also comprises a hydrogenation device, into which pyrolysis oil retrieved from the pyrolysis product, and at least a portion of the separated hydrogen gas recuperated from the separation device are introduced for a hydrogenation step, in which the pyrolysis oil is hydrogenated by the presence of the hydrogen gas, wherein hydrocarbons that are substantially free from oxygen are produced.

In a specific embodiment the apparatus further includes a condenser, in which the pyrolysis product from the pyrolysis reactor is cooled so as to form pyrolysis oil and pyrolysis gas, wherein the pyrolysis oil is arranged to be conveyed to the hydrogenation device.

In a specific embodiment a biomass dryer is arranged for drying wet biomass into dry biomass, which dry biomass is conveyed to the pyrolysis reactor.

At least one heat exchanger is preferably provided, wherein excess heat of at least one part of the apparatus is utilised in a heat demanding step of at least one other part of the apparatus.

In a specific embodiment all parts of the apparatus except the gasification reactor are heated by excess heat from other parts of the apparatus.

In another specific embodiment all parts of the apparatus are heated by excess heat from other parts of the apparatus or from exothermic reactions of residual products produced in other parts of the apparatus.

Other embodiments and advantages will be apparent from the detailed description and the appended drawings.

BRIEF DESCRIPTION OF DRAWINGS

An exemplary embodiment related to the invention will now be described with reference to the appended drawing, of which;

FIG. 1 shows a flow chart of a process according to a specific embodiment of the invention, in which flow chart the apparatuses of a plant for performing said process are schematically shown.

DETAILED DESCRIPTION OF EMBODIMENTS

In FIG. 1, a schematic flow chart of a process according to a specific embodiment of the invention is shown. According to one aspect the process is a closed system with a high yield, wherein apart from the raw material comprised of biomass substantially no additional materials will be needed in the process, other than water and air. All steps of the process are individually known in the art and are therefore only briefly described. According to one aspect the invention resides in the combination and order of the process steps, which enables production of hydrocarbons from biomass with a high energy yield and without the use of other resources. The process may advantageously be a continuous process with a continuous feed of biomass and a continuous production of bio oil, which bio oil is comprised of pure hydrocarbons. In the context of this application "pure hydrocarbons" signifies that the hydrocarbons are substantially free from other contents, such as nitrogen, sulphur or oxygen.

FIG. 1 schematically also shows a number of units, which form the plant for carrying out the process. The connections, tubes etc. which connect the device's units are not described or displayed in detail. The connections, pipes etc. are appropriately designed to perform their function, i.e. to transport gases, liquids and solids between the plant's units. A skilled person knows how to dimension these parts and they are therefore not described in detail in this application. The invention is based on the function of the plant and the interaction of the units comprised in the plant.

In FIG. 1, a process solution for a hydrogen treatment of pyrolysis oil from an integrated biomass gasification unit is shown. The gasification starts with wet biomass $B_w$ into a biomass dryer 1 producing dried biomass $B_d$. Also, the dryer 1 may function as a heat sink in that heat produced at a later step of the process is utilized to heat the dryer 1. In the shown embodiment, hot water $W_{out}$, in the form of steam is recovered from cooling device 9 arranged in a later step of the process. In the heat exchange of the dryer 1, the incoming hot water $W_{out}$, is condensed into condensed water $W_{cd}$, wherein the heat release from the cooling and change of phase of the water is utilized to heat the wet biomass $B_w$.

The drying step is optional in so much as it may be omitted if the provided biomass has a dryness allowing it to be provided directly to the second step of the process. In said second step the dried biomass $B_d$ is fed into an indirectly heated pyrolysis reactor 2 producing a pyrolysis product PP and char C. In the pyrolysis step the dried biomass $B_d$ is heated to about 350-500° C. in the absence of oxygen or any halogen, wherein char C and a pyrolysis product PP mainly consisting of hydrocarbons with a high oxygen content are produced. The pyrolysis product PP is conveyed into a condenser 8, which will be more closely described further below.

The char C produced in the pyrolysis step is subsequently injected into an indirectly heated gasification reactor 3, typically a ceramic lined reactor. Steam $W_s$ is provided into the gasification reactor 3. Such a reactor is in itself known to a person skilled in the art and is inter alia described in WO 2009/151369 A1, which is hereby included in this application by reference.

The fact that the gasification reactor 3 is indirectly heated implies that substantially no oxygen is present in the gasification reactor 3. Thereby, the inherent energy of the char will be retained such that it will be preserved and form part of the final product. Namely, if oxygen would be present at least a portion of the char would be combusted such that energy would be lost, and carbon dioxide would be produced. This would be contrary to the object of the invention to generate hydrocarbons with none or a very low content of oxygen at a high energy yield in a renewable process.

The temperature inside the gasification reactor 3 is typically between 900-1300° C., and the pressure may be controlled between atmospheric pressure and up to a very high pressure of up to 100 bar. Typically, the gasification reactor needs to be heated. In a preferred aspect, this heating is achieved by residual products of other steps of the process and hence without the need of external resources, or in a less preferred embodiment this is the only step of the process where external resources, typically in the form of heat, is provided to the process. In the shown embodiment heat for the gasification reactor 3 is produced from residual products of the process in a heat exchanging device 10, which is more closely described below.

The atmosphere inside the gasification reactor 3 is substantially free from oxygen and halogens. In the gasification reactor 3 hot synthesis gas $S_h$ is produced from the char C and the supplied steam $W_s$. The synthesis gas produced by such char gasification is not a pure gas and is generally comprised of a mixture of approximately 25 to 30% carbon monoxide, approximately 55 to 60% hydrogen, approximately 5 to 15% carbon dioxide, and 0 to 5% methane. It may also contain lesser amount of other gases.

Downstream of the gasifier, a gas cooler 4 is arranged. Inside the gas cooler 4 the hot synthesis gas $S_h$ is cooled into cooled synthesis gas $S_{rt}$. The gas cooler 4 also functions as a heat exchanger, such that the heat from the hot synthesis gas $S_h$ is recuperated. This may be achieved in different manners. In the shown embodiment, steam $W_{st}$ that is consumed in the gasification process is boiled from water $W_{in}$ inside the gas cooler 4. Hence, the produced steam $W_{st}$ that is produced in the heat exchange of the gas cooler 4 is conveyed to the gasification reactor 3.

The cooled synthesis gas $S_{rt}$ from the gas cooler 4 is fed into a gas conditioning and pressurizing system 5 in which a purified synthesis gas $S_p$ is generated, typically comprising mainly carbon monoxide CO and hydrogen $H_2$. The purified synthesis gas $S_p$ is conveyed to a gas separation device 6, which typically is a pressure swing adsorption (PSA) or membrane system, in which hydrogen $H_2$ is separated from the purified synthesis gas $S_p$.

The residual gas $RG_1$ from the gas separation device 6 is typically an energy gas, which may be used as a heat source $H_{gf}$ for the gasification process in the gasification reactor 3.

The combustion of the residual gas $RG_1$ recovered in the heat exchanging device 10 also generates at least a part of the excess heat $H_{pd}$ to be utilized in the heating of the dryer 1 and/or the pyrolysis reactor 2.

The generated pyrolysis product PP is cooled in a condenser 8, which functions as a heat exchanger at the same time as it generates a pyrolysis gas PG and a liquid pyrolysis oil PO. The condensation in condenser 8 gives excess heat $HR_1$, which can be utilized for pre-drying or other low temperature applications such as district heating. The pyrolysis gas PG is utilized for the heating of the gasification reactor 3 in a similar way as the residual gas $RG_1$. In the shown embodiment both the residual gas $RG_1$ and the pyrolysis gas PG are conveyed to the heat exchanger 10 in which combustion thereof will generate the excess heat $H_{pd}$ to be utilized in heating the dryer 1 and pyrolysis reactor 2 and the heat source $H_{gf}$ for the gasification process 3.

Pyrolysis oil PO retrieved from the condenser 8 and the hydrogen $H_2$ retrieved from the gas separation device 6 is fed into a hydrogenation reactor 7. The hydrogenation reactor 7 is preferably equipped with a catalytic process designed for hydrogenation of pyrolysis oil PO by means of hydrogen $H_2$. The pyrolysis oil PO is typically an oxygenated hydrocarbon usually called tar. The pyrolysis oil PO originates from either of the compounds in biomass such as cellulose, hemi-cellulose and/or lignin which typically forms tars under the pyrolysis process 2. The desired reaction in the hydrogenation reactor 7 of the inventive apparatus is a controlled removal of oxygen from the pyrolysis oil PO by the hydrogen $H_2$ to generate pure hydrocarbons and water. Other reaction may also occur inside said hydrogenation reactor. The catalytic reaction can be optimized using elevated temperature and pressure to drive a complete conversion of pyrolysis oil PO to pure hydrocarbons (oxygen free hydrocarbons) as a pure bio oil BO.

In cases where the catalytic reaction is performed at an elevated temperature a cooling device 9 is preferably provided downstream of the hydrogenation reactor 7 to decrease the temperature of the extracted hot bio oil $BO_h$ to bio oil BO of normal handling temperature and extraction of water $W_{out}$. The excess heat $HR_2$ generated in the cooling device 9 can be utilized for pre-drying or other low temperature applications i.e. district heating. In the reaction taking place in the hydrogenation reactor 7 a residual gas $RG_2$ is produced. This residual gas $RG_2$ is rich in hydrogen and may be used as a complement to the residual gas $RG_1$ recuperated from the gas separation device 6 in the heat exchanger 10.

The water $W_{in}$ needed in the gas cooler 4, where hot synthesis gas $S_h$ is cooled into cooled synthesis gas $S_{rt}$, may be recovered from recycling of the produced water $W_{out}$ from the cooling device 9, Further though, condensed water $W_{cd}$ may also be retrieved in dryer 1, from the inherent water of the incoming wet biomass $B_w$. The condensed water $W_{cd}$ may also be circulated to the gas cooler 4.

Above, the invention has been described with reference to a specific embodiment. The invention is however not limited to these embodiments. It is obvious to a person skilled in the art that other embodiments are possible within the scope of the following claims.

The invention claimed is:

1. A process for producing hydrocarbons from biomass, the process comprising the following steps:
   a pyrolysis step in which dry biomass (Bd) is heated in an environment substantially free from oxygen and halogens, wherein a pyrolysis product (PP) and char (C) is produced;
   a pyrolysis separator step in which the char (C) is separated from the pyrolysis product (PP),
   a gasification step, in which the separated char (C) is heated in an environment containing water steam ($W_E$t) but substantially no oxygen or halogens so as to reduce said char (C) to produce a synthesis gas (Sh),
   a step of cooling the produced synthesis gas (Sh) and a step of refining the cooled synthesis gas to produce a purified synthesis gas ($S_p$),
   separating hydrogen gas ($H_2$) from the purified synthesis gas ($S_p$), and
   retrieving pyrolysis oil (PO) by separating at least a portion of the hydrogen gas ($H_2$) and recuperating it into a hydrogenation step, in which the pyrolysis oil (PO) is hydrogenated by the presence of the hydrogen gas ($H_2$), wherein hydrocarbons (BO) that are substantially free from oxygen are produced.

2. The process according to claim 1, wherein a step of drying wet biomass ($B_w$) into dry biomass ($B_d$) is performed prior to the pyrolysis step.

3. The process according to claim 2, wherein the pyrolysis product (PP) is cooled in a condenser (8), whereby excess heat (HRi) is produced, which excess heat (HRi) is utilized in the step of drying wet biomass ($B_w$).

4. The process according to claim 2, wherein the produced hydrocarbons (BOh) is cooled in a cooling device (9) and wherein excess heat (HR$_2$) is generated in said cooling device (9), which is utilized in the step of drying wet biomass (B$_w$).

5. The process according to claim 2, wherein at least one step of heat exchange is comprised in the process, where excess heat of at least one step is utilized in a heat demanding step of at least heating dry biomass, or drying wet biomass, or gasification.

6. The process according to claim 1, wherein at least one step of heat exchange is comprised in the process, where excess heat of at least one step is utilized in a heat demanding step of at least heating dry biomass, or drying wet biomass, or gasification.

7. The process according to claim 6, wherein all steps of the process except the step of heating the separated char (C) to produce a synthesis gas (Sh) are heated by excess heat from other steps of the process.

8. The process according to claim 6, wherein all steps of the process are heated by excess heat from other steps of the process or from exothermic reaction of residual products produced in other steps of the process.

9. The process according to claim 6, wherein a residual gas (RGi) produced in the gas separator step is utilized in heat exchanger (10) to produce heat (H$_{gf}$) for the step of gasification of the separated char (C) and/or heat (H$_{pd}$) for the pyrolysis step.

10. The process according to claim 6, wherein a residual gas (RG$_2$) produced as a byproduct in the hydrogenation step is utilized in a heat exchanger (10) to produce heat (Hgf) for the step of gasification of the separated char (C) and/or heat (H$_p$d) for the pyrolysis step.

11. An apparatus for producing hydrocarbons from biomass, the apparatus comprising:
a pyrolysis reactor (2) in which dry biomass (Bd) is heated in an environment substantially free from oxygen and halogens, wherein a pyrolysis product (PP) and char (C) is produced;
a gasification reactor (3) in which the separated char (C) is heated in an environment containing steam (W$_s$t) but substantially no oxygen or halogens so as to reduce said char (C) to produce a synthesis gas (Sh),
a gas cooler (4) in which the produced synthesis gas (Sh) is cooled to a cooled synthesis gas (S$_{rt}$);
a conditioning and pressure system (5), in which the cooled synthesis gas (S$_{rt}$) is refined so as to produce a purified synthesis gas (S$_p$),
a separation device (6), in which hydrogen gas (H$_2$) is separated from the purified synthesis gas (S$_p$),
wherein the apparatus also comprises a hydrogenation device (7), into which pyrolysis oil (PO) retrieved from the pyrolysis product (PP), and at least a portion of the separated hydrogen gas (H$_2$) recuperated from the separation device (6) are introduced for a hydrogenation step, in which the pyrolysis oil (PO) is hydrogenated by the presence of the hydrogen gas (H$_2$), wherein hydrocarbons (BO) that are substantially free from oxygen are produced.

12. The apparatus according to claim 11, wherein the apparatus further includes a condenser (8), in which the pyrolysis product (PP) from the pyrolysis reactor (2) is cooled so as to form pyrolysis oil (PO) and pyrolysis gas (PG), wherein the pyrolysis oil (PO) is arranged to be conveyed to the hydrogenation device (7).

13. The apparatus according to claim 12, wherein a biomass dryer (1) is arranged for drying wet biomass (B$_w$) into dry biomass (Bd), which dry biomass (Bd) is conveyed to the pyrolysis reactor (2).

14. The apparatus according to claim 13, wherein at least one heat exchanger is provided, and wherein excess heat of at least one part of the apparatus is utilized to provide heat to at least the pyrolysis reactor (2), or a dryer (1), or the gasification reactor (3).

15. The apparatus according to claim 12, wherein at least one heat exchanger is provided, and wherein excess heat of at least one part of the apparatus is utilized to provide heat to at least the pyrolysis reactor (2), or a dryer (1), or the gasification reactor (3).

16. The apparatus according to claim 11, including a dryer (1) for drying wet biomass in which the dryer is operatively connected to a conveyor for conveying the dried biomass to the pyrolysis reactor (2).

17. The apparatus according to claim 16, wherein at least one heat exchanger is provided, and wherein excess heat of at least one part of the apparatus is utilized to provide heat to at least the pyrolysis reactor (2), or a dryer (1), or the gasification reactor (3).

18. The apparatus according to claim 11, wherein at least one heat exchanger is provided, and wherein excess heat of at least one part of the apparatus is utilized to provide heat to at least the pyrolysis reactor (2), or a dryer (1), or the gasification reactor (3).

19. The apparatus according to claim 18, wherein all parts of the apparatus except the gasification reactor are heated by excess heat from other parts of the apparatus.

20. The apparatus according to claim 18, wherein all parts of the apparatus are heated by excess heat from other parts of the apparatus or from exothermic reactions of residual products produced in other parts of the apparatus.

21. The apparatus according to claim 11, wherein said apparatus comprises means for internally producing hydrogen during the production of hydrocarbons from biomass.

* * * * *